Aug. 22, 1967  P. W. NORMAN  3,336,672
DRAWING INSTRUMENT
Filed March 23, 1966
2 Sheets-Sheet 1
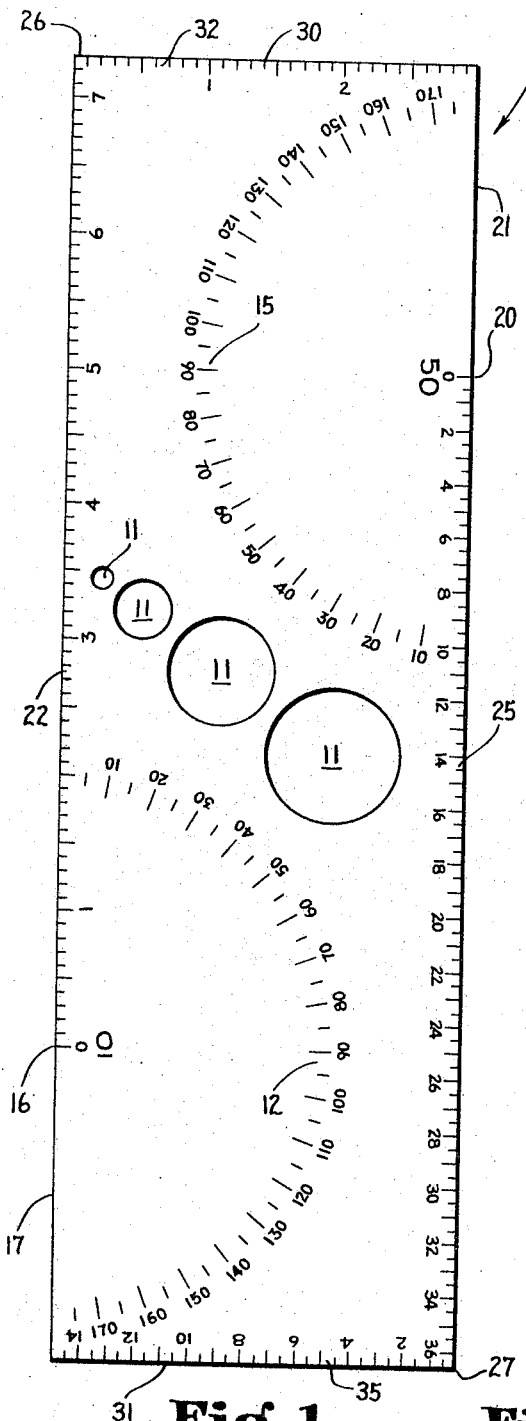
Fig. 1.  Fig. 2.
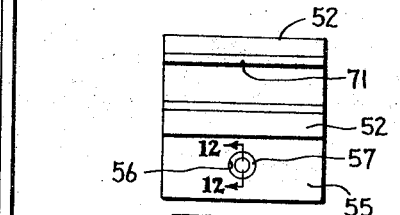
Fig. 3.  Fig. 4.
Fig. 5.  Fig. 7.
Fig. 6.
Fig. 8.
Fig. 9.
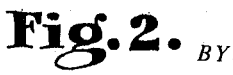
INVENTOR.
PAUL W. NORMAN
BY
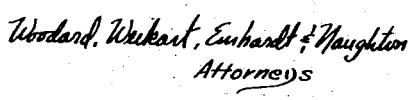
Attorneys Aug. 22, 1967  P. W. NORMAN  3,336,672
DRAWING INSTRUMENT Filed March 23, 1966  2 Sheets-Sheet 2

INVENTOR.
PAUL W. NORMAN
BY
Woodard, Weikart, Emhardt & Naughton
Attorneys

United States Patent Office 3,336,672
Patented Aug. 22, 1967

3,336,672
DRAWING INSTRUMENT
Paul W. Norman, 2116 California St.,
Columbus, Ind. 47201
Filed Mar. 23, 1966, Ser. No. 536,756
7 Claims. (Cl. 33—27)

ABSTRACT OF THE DISCLOSURE

A drawing instrument including a flat apertured body of transparent material having a pair of parallel calibrated straight edges with protractors inscribed on said body. Clips are provided which can be placed on said body to use the drawing instrument as a protractor, said clips having tapered rubberlike gripper members for retaining lead and a pointed member.

---

The present invention relates to a drawing instrument. Frequently a draftsman will be required to draw one line of given length at an angle to another line. This may be accomplished by the use of three instruments and by two or three drafting movements or operations. Thus a protractor may first be used, then a scale and finally a straight edge. One object of the present invention is to provide a drawing instrument which reduces the tools and operations needed to draw a line of given length at an angle to another line.

Another object of this invention is to provide an improved drawing instrument.

Still another object of this invention is to provide a drawing instrument usable to draw a plurality of parallel lines for guide lines or other purposes.

A further object of this invention is to provide a drawing instrument usable as a compass.

Still a further object of this invention is to provide a drawing instrument usable to quickly and easily draw a line of desired length at a right angle to another line.

Another object of the invention is to provide a drawing instrument incorporating improved means for gripping and holding a marking element or lead in such a manner that the marking element is firmly held while in use yet is easily removable from the drawing instrument for sharpening or replacement.

Related objects and advantages will become apparent as the description proceeds.

One embodiment of the present invention might include a drawing instrument comprising a flat body of transparent material and having a first straight edge, a first protractor inscribed on said body, said protractor having its center located on said straight edge, the angles of said protractor being laid off on said flat body from said straight edge, a scale inscribed on said straight edge, said scale being inscribed with numerals increasing in linear progression from zero at said center.

The full nature of the invention will be understood from the accompanying drawings and the following description and claims.

FIG. 1 is a plan view of a drawing instrument embodying the present invention.

FIG. 2 is a side elevation of the structure of FIG. 1.

FIG. 3 is a detail view of a pointed element usable as a part of a compass in the present invention.

FIG. 4 is a detail view of a clip upon which the pointed element of FIG. 3 is mounted.

FIG. 5 is a side elevation of the structure of FIG. 4.

FIG. 6 is a detail view of a marking element or lead usable in the compass portion of the present invention.

FIG. 7 is a front elevation of a clip which mounts the lead of FIG. 6.

FIG. 8 is an enlarged side elevation of the structure of FIG. 7.

FIG. 9 is a top plan view of the structure of FIG. 8.

Figure 10:
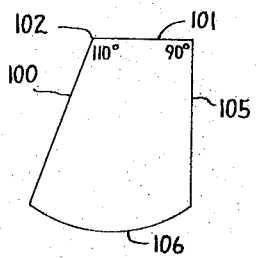
FIGS. 10 and 11 are drawing illustrations which will be used in describing the operation of the device of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a drawing instrument which includes a flat transparent body 10 of rectangular outline. The body 10 has formed therein four circular apertures 11 which serve as circle templates. Inscribed upon the body 10 are a pair of protractors 12 and 15. The protractor 12 has its center 16 located at the straight edge 17 which forms one longitudinally extending side of the body 10. The protractor 15 has its center 20 located at the straight edge 21 which forms the other or opposite longitudinally extending side of the rectangular outline.

Each of the straight edges 17 and 21 has a scale 22 and 25, respectively, inscribed on the straight edge. The scale 22 has its zero marking at the center 16. Also, the scale increases in linear progression from the zero at the center 16 to the opposite end 26 of the scale. As shown in FIG. 1, the numerical marking of the scale 22 is according to the number of inches away from the zero point of scale at 16. The scale 25 is inscribed with numerals increasing in linear progression from zero at the center 20 to the opposite end of the scale at 27. The particular scale used for the scale 25 happens to be one inch equals fifty feet. Thus, at one inch away from the beginning of the scale at 20 the graduation represents 50 feet while two inches from the zero point at 20 is indicated by the numeral 10 which, of course, represents 100 feet. Any suitable scales can be used in place of the illustrated scales 22 and 25. The scales used, however, should increase in linear progression and should have equivalent markings in each of the scales. In other words, the graduations of the scale 22 are spaced equally to the graduations of the scale 25 for a purpose to be described below.

The body 10 also has transversely extending straight edges 30 and 31 formed thereon, said transversely extending straight edges forming the third and fourth sides of the rectangular outline of the body 10. The straight edge 30 has a scale 32 formed thereon which has its zero point at the end 26 of the scale 22. The straight edge 31 has a scale 35 inscribed thereon which begins with its zero point at the end point 27 of the scale 25.

Referring now to FIGS. 3, 4 and 5, there is illustrated a clip 40 which has a generally U-shape including the base 41 and a pair of legs 42. One of the legs 42 is enlarged and has a bore 45 therein within which is press fitted a pointed element 46. Inscribed on the inside surface of the U-shaped element and more particularly upon one of the legs 42 is a straight line 47 which is visible through the clip, said clip being made of transparent material. The straight line 47 is aligned with the axis of the bore 45 when the clip is viewed as in FIG. 4.

Figure 12:
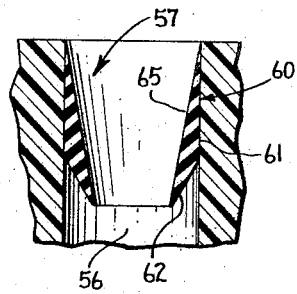
FIG. 12 is an enlarged section taken along the line 12—12 of FIG. 9 in the direction of the arrows.

Referring to FIGS. 6, 7, 8 and 9, there is illustrated a further clip 50 which has a U-shape, including the base 51 and the legs 52. One of the legs 52 is enlarged at 55 and has a bore 56 which extends completely through the enlarged portion 55. Received within the bore 56 are annular mounting members 57 which are shown in more detail in FIG. 12. Each of the annular mounting members 57 is formed of resilient friction material such as rubber or the like. Each of the annular members 57 has an outer configuration which is divided into two parts. The part 61 of the outer configuration is cylindrical, while the part 62 tapers inwardly toward the axis of the bore 56. The inside surface 65 of the annular element 57 is tapered at a constant angle all along the length thereof inwardly toward the axis of the bore 56. It can be appreciated that the marking element or lead 70 of FIG. 6 will be firmly gripped by the annular element 60 against upward movement as viewed in FIG. 12. Even so, the lead 70 can be easily mounted in the bore 56 and removed from the bore 56 by pulling the lead 70 downwardly as viewed in FIG. 12.

The clip of FIGS. 7, 8 and 9 is provided with a line 71 inscribed on the inside of one of the legs 52 in the same manner as the line 47 of FIGS. 4 and 5. Thus when the clip of FIGS. 7, 8 and 9 is viewed as illustrated in FIG. 7, the line 71 is aligned with the axis of the bore 56. It can be appreciated that the alignment of the line 71 with the lead 70 and the alignment of the line 47 with the pointed element 46 means that the spacing apart of the pointed element 46 and the lead 70 will be equal to the spacing apart of the lines 46 and 71. When the clips 40 and 50 are mounted on the scale 25 or the scale 22, the lines 46 and 71 can be easily and precisely set at any desired graduation on the scale. Thus, the spacing between the pointed element 46 and the lead 70 is accurately and precisely set.

Figure 13:
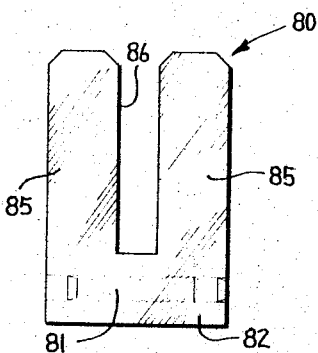
FIG. 13 is a view similar to FIG. 8 of an alternative clip usable in the present invention.
Figure 14:
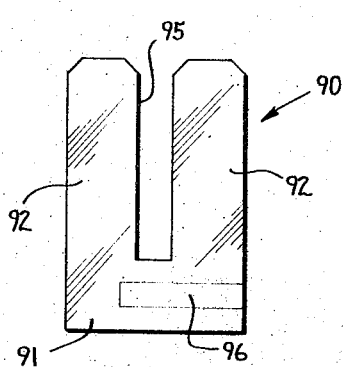
FIG. 14 is a view similar to FIG. 5 of an alternative clip usable as a part of the present invention.
Figure 16:
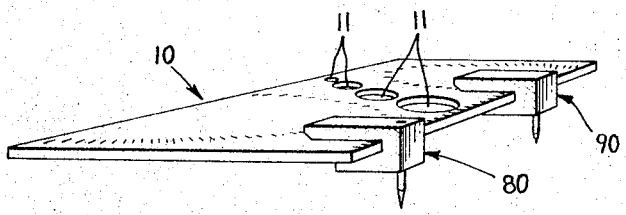
FIG. 16 is a perspective assembly view similar to FIG. 15 but showing the alternative structure of FIGS. 13 and 14.
Figure 15:
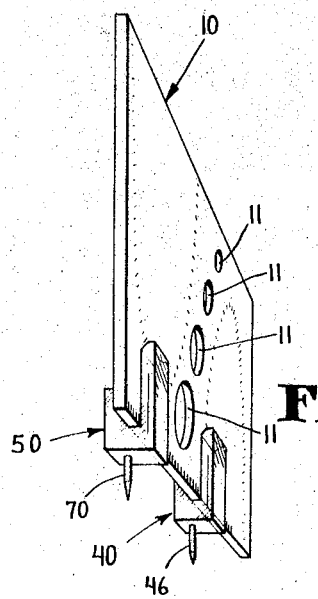
FIG. 15 is a perspective assembly view showing the structure of FIGS. 1–9 when the drawing instrument of the present invention is used as a compass.

As shown in FIG. 15, the use of the clips 40 and 50 causes the pointed element 46 and the lead 70 to be arranged parallel to the flat body 10. As shown in FIG. 16, the flat body 10 may also be arranged perpendicularly of the pointed element 46 and the lead 70. This is accomplished by use of the clips 80 and 90 of FIGS. 13 and 14 respectively. The clip 80 of FIG. 13 is intended to replace the clip 50 of FIG. 8 and is identical thereto in all respects except for the fact that the bore 81 corresponding to bore 56 is arranged in the base 82 of the U-shaped element instead of in the leg thereof as in FIG. 8. Also the U-shaped element of FIG. 13 has somewhat thicker legs 85 than does the U-shaped element of FIG. 8. The clip 80 of FIG. 13 is, however, provided with a line 86 which is identical to the line 71 of FIG. 8 and functions in identical manner.

Referring to FIG. 14, the clip 90 includes a base 91 and legs 92 and a line 95 corresponding to the line 47 of FIG. 4. In FIG. 14 the aperture 96 corresponding to the aperture 45 of FIG. 5 is arranged in the base 91 instead of in one of the legs as in FIG. 5. It should be mentioned that the line 86 and the line 95 are aligned with the axes of the bore 81 and the bore 96. In other words, the line 86 intersects the axis of the bore 81 and the line 95 intersects the axis of the bore 96.

The drawing instrument of the present invention may be used to draw the figure of FIG. 10. Assume that line 100 of FIG. 10 has already been drawn. In order to draw line 101, the instrument 10 is laid flat on the drawing paper with the zero mark 16 on the scale 22 located at 102. The 110° mark on the protractor 12 is positioned over the line 100. This causes the scale 22 to extend to the right away from the point 102 with the zero point of the scale located at 102. The line 101 is then drawn to exactly the desired length by merely observing the markings on the scale 22. Thus it is unnecessary to first measure the distance of the line 101 to be drawn. Next the line 105 is drawn in similar fashion. Finally in order to draw the line 106 the compass is assembled as shown in either FIG. 15 or FIG. 16 with the clips used having their lines either 47 and 71 or in the case of the clips 80 and 90 the lines 86 and 95 aligned with the desired scale graduations. The pointed element 46 is then placed at the center of the curve 106 and the curve inscribed.

Figure 11:
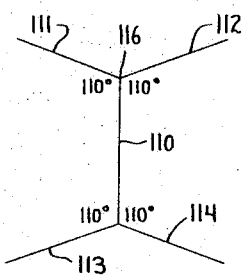

Referring now to FIG. 11, and assuming that the line 110 has already been drawn, each of the lines 111, 112, 113 and 114 can be drawn by a single operation. Thus the zero point 16 of the scale 22 or the zero point 20 of the scale 25 is placed at the point 116 at the end of the line 110. The 110° angle is laid off on the protractor either 12 or 15 and the scale either 22 or 25 is extended in the direction of the line. With the 110° angle of the protractor covering the line 110, the line 111 or the line 112 is then drawn. The lines 113 and 114 are drawn in similar fashion.

It will be evident from the above description that the present invention provides a drawing instrument which reduces the tools and operations needed to draw a line of given length at an angle to another line. The present invention also provides a drawing instrument usable to draw a plurality of parallel lines for guide lines or other purposes. As mentioned above, the graduations in the scale 22 are equally spaced to the graduations in the scale 25. In order to draw a plurality of parallel lines, all that need be done is the placing of the tool 10 on the paper and the marking of points as located by the graduations on each of the scales 22 and 25. Since the points so marked by use of the graduations in the scales 22 and 25 are equally spaced, the plurality of parallel lines are then drawn by connecting each point from the scale 22 with the corresponding point from the scale 25.

Either the scale 32 or the scale 35 can be used for quickly drawing a line of desired length at a right angle to another line. This is accomplished by placing either the scale 22 or the scale 25 along the original line with the point 26 or the point 27 at the end of the line and at the junction of the original line and the desired line. Either the scale 32 or the scale 35 is then used to draw the line to the desired length by observing the numbered graduations of the respective scale.

It will be evident from the above description that the drawing instrument of the present invention provides improved means for gripping and holding a marking element or lead. Thus the structure best shown in FIG. 12 permits the lead to be quickly and easily mounted and replaced, but also firmly holds the lead while the device is being used as a compass.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A drawing instrument comprising a flat body of transparent material and having a first straight edge, a first protractor inscribed on said body, said protractor having its center located on said straight edge, the angles of said protractor being laid off on said flat body from said straight edge, a scale inscribed on said straight edge, said scale being inscribed with numerals increasing in linear progression from zero at said center, a pair of clips, a pointed element mounted on one of said clips, a marking element mounted on the other of said clips, each of said clips having a straight mark thereon, each of said marks being located on the inside of its respective clip where the mark can be positioned closely adjacent said scale when the clip is placed on the flat body, said marks being so located on said clips that, when said marks are placed against particular graduations on said scale, said pointed element and marking element are spaced apart the same distance as said marks, said other clip has a bore therethrough for mounting said marking element, said marking element having a cylindrical external shape, a pair of annular gripper members received in said bore in coaxial relation thereto, each of said annular gripper members being formed of resilient friction material, each of said members having an external surface in two portions, the first of said two portions being cylindrical, the second of said two portions being located closer to one end of said bore and tapering inwardly and toward the one end of said bore, the internal surface of said annular gripper members tapering inwardly and toward the one end of said bore.

2. The drawing instrument of claim 1 wherein said body has formed therein a plurality of circle template apertures.

3. In a drawing instrument, a clip having a bore therethrough for mounting a marking element, said marking element having a cylindrical external shape, a pair of annular gripper members received in said bore in coaxial relation thereto, each of said annular gripper members being formed of resilient friction material, each of said annular gripper members having an external surface in two portions, the first of said two portions being cylindrical, the second of said two portions being located closer to one end of said bore and tapering inwardly toward the one end of said bore, the internal surface of said annular gripper members tapering inwardly and toward the one end of said bore.

4. The invention of claim 3 further comprising a second clip, and a pointed element mounted on said second clip, and wherein each of said clips has a U-shape with a base and two legs, said marking element and said pointed element being mounted in said bases of the respective U-shaped clips with said elements extending in perpendicular relation to said legs.

5. The invention of claim 4 additionally comprising a flat body having a first straight edge, and a scale inscribed on said straight edge, and wherein each of said clips has a straight mark thereon, each of said marks being located on the inside of its respective clip where the mark can be positioned closely adjacent said scale when the clip is placed on the flat body, said marks being so located on said clips that, when said marks are placed against particular graduations on said scale said pointed element and said marking element are spaced apart the same distance as said marks.

6. The invention of claim 5 wherein each of said clips has a U-shape with a base and two legs, said marking element and said pointed element being mounted in said bases of the respective U-shaped clips with said elements extending in perpendicular relation to said legs.

7. The invention of claim 6 wherein said body has formed therein a plurality of circular template apertures.

References Cited

UNITED STATES PATENTS

| 551,659 | 12/1895 | Toquet | 33—41 |
| 839,604 | 12/1906 | Kralund | 33—158 |
| 1,975,400 | 10/1934 | Mayfield | 33—1 |
| 2,039,333 | 5/1936 | Musham | 33—1 |
| 2,134,863 | 11/1938 | Dvorak | 120—103 X |
| 2,581,534 | 1/1952 | Hungerford | 33—41 |

FOREIGN PATENTS

| 114,750 | 2/1942 | Australia. |
| 526,747 | 7/1921 | France. |
| 597,799 | 9/1925 | France. |
| 786,814 | 6/1935 | France. |
| 403,701 | 10/1934 | Germany. |
| 5,111 | 1888 | Great Britain. |
| 203,455 | 9/1923 | Great Britain. |
| 554,423 | 1/1957 | Italy. |

LEONARD FORMAN, *Primary Examiner.*

HARRY N. HAROIAN, *Examiner.*